United States Patent
Kepler

(10) Patent No.: US 11,662,239 B2
(45) Date of Patent: May 30, 2023

(54) DISPENSER FOR GRANULES

(71) Applicant: National University of Singapore, Singapore (SG)

(72) Inventor: Veit Frederik Kepler, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 17/493,926

(22) Filed: Oct. 5, 2021

(65) Prior Publication Data

US 2022/0113174 A1 Apr. 14, 2022

(30) Foreign Application Priority Data

Oct. 9, 2020 (SG) .......................... 10202010030U

(51) Int. Cl.
*G01F 11/24* (2006.01)
*B65D 83/04* (2006.01)
*A61J 1/03* (2023.01)

(52) U.S. Cl.
CPC .......... *G01F 11/24* (2013.01); *B65D 83/0409* (2013.01); *A61J 1/03* (2013.01)

(58) Field of Classification Search
CPC ..... G01F 11/24; G01F 11/46; B65D 83/0409; A61J 1/03; A61J 3/074
See application file for complete search history.

(56) References Cited

U.S. PATENT DOCUMENTS 2,227,167 A * 12/1940 Warren .............. B65D 83/0409
   221/265
2,761,592 A * 9/1956 Lewis ................ B65D 83/0409
   222/370

(Continued)

OTHER PUBLICATIONS

Search and Examination Report for Singapore Patent Application No. 10202111161R, dated Aug. 30, 2022.

*Primary Examiner* — Donnell A Long
(74) *Attorney, Agent, or Firm* — Botos Churchill IP Law LLP

(57) ABSTRACT

A dispenser (100, 500, 900) for granules is disclosed herein. In a specific embodiment, the dispenser comprises a granular reservoir (1); a selector disk comprising (a) a feeder disk (2, 22, 52) comprising at least one protruding member (3, 23); and (b) a dispensing disk (8, 58) arranged to rotate in concert with the feeder disk (2, 22, 52). The dispensing disk further comprises at least one dispensing aperture (9) and a non-dispensing portion (103), the at least one dispensing aperture (9) being in registration with the at least one protruding member (3, 23). The dispenser (100, 500, 900) further comprises a holding disk (4, 94) comprising at least one through-hole (5) sandwiched between the feeder disk (2, 22, 52) and the dispensing disk (8, 58) and fixedly mounted with respect to the granular reservoir (1), wherein the selector disk is rotatable relative to the holding disk (4, 94) and the granular reservoir (1) between a first position in which the at least one protruding member (3, 23) is offset from the at least one through-hole (5) to allow a granule to be received from the granular reservoir and held within the at least one through-hole (5) by the non-dispensing portion (103) of the dispensing disk (8, 58) and a second position in which the at least one protruding member (3, 23) occludes the at least one through-hole (5) to allow the granule held in the at least one through-hole to dispense through the at least one dispensing aperture (9). Methods of dispensing granules using the dispenser (100, 500, 900) are also disclosed.

18 Claims, 9 Drawing Sheets

(56) References Cited

U.S. PATENT DOCUMENTS

| | | | | |
|---|---|---|---|---|
| 2,886,209 | A | * | 5/1959 | Lermer ............. B65D 83/0409 |
| | | | | 222/452 |
| 3,730,387 | A | * | 5/1973 | McConnell ........ B65D 83/0409 |
| | | | | 222/452 |
| 3,889,847 | A | * | 6/1975 | Uroshevich ........ B65D 83/0409 |
| | | | | 215/217 |
| 3,991,908 | A | * | 11/1976 | Thomas ............. B65D 83/0409 |
| | | | | 221/265 |
| 4,613,057 | A | * | 9/1986 | Sacchetti ........... B65D 83/0409 |
| | | | | 221/265 |
| 4,782,981 | A | | 11/1988 | Schuster |
| 5,529,221 | A | | 6/1996 | Roy |
| 5,791,515 | A | * | 8/1998 | Khan ................. B65D 83/0409 |
| | | | | 221/265 |
| 7,810,673 | B2 | * | 10/2010 | Lancesseur ........ B65D 83/0409 |
| | | | | 221/265 |
| 7,992,748 | B2 | * | 8/2011 | Lawrence ............... G07F 11/54 |
| | | | | 221/256 |
| 8,047,408 | B2 | | 11/2011 | Eaton et al. |
| 2015/0090733 | A1 | | 4/2015 | Park |
| 2018/0303718 | A1 | * | 10/2018 | Song ..................... A61J 7/0445 |
| 2018/0346230 | A1 | | 12/2018 | Zilligen et al. |
| 2020/0206087 | A1 | * | 7/2020 | Provencher ............. G07F 11/44 |

* cited by examiner

DISPENSER FOR GRANULES

CROSS-REFERENCE TO RELATED APPLICATIONS

The present application claims priority from Singapore Patent Application No. 10202010030U, filed Oct. 9, 2020, the disclosure of which is incorporated herein by reference.

BACKGROUND OF THE INVENTION

The invention relates to a dispenser for granules, particularly for use in dispensing medical drug dosages for patients.

Recipients of polypharmacy—the prescription of 3 or more different drugs—are at higher risk of low adherence rates than patients prescribed only a single medication, mostly due to the burden of having to consume multiple medications, which are conventionally provided in separate packaging. This increases the risk of forgoing treatment regimens, either consciously (disregarding drugs due to their aggravation at consuming them) or unconsciously (forgetting about medications). Providing drugs comprising different active substances in different packaging also makes it difficult and onerous to customize treatment to the needs of individual patients. However, dispensing customized quantities of medications to a single drug packaging in amounts accurate enough for use by patients is challenging.

It is desirable to produce a dispenser which addresses at least one of the drawbacks of the prior art and/or to provide the public with a useful choice.

BRIEF SUMMARY OF THE INVENTION

In a first aspect, there is provided a dispenser for granules. The dispenser for granules comprises a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and is fixedly mounted (i.e. stationary) with respect to the granular reservoir, wherein the selector disk is rotatable/movable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture. The dispenser may or may not include a plurality of granules received in the granular reservoir, for example, granules comprising a diameter in the range from about 0.5 mm to about 3 mm.

The described embodiments may enable the dispenser to ensure reliable dispensing of precise quantities of granules, including single granules if desired, and may further ensure continuous dispensing regardless of the number of granules remaining in the granular reservoir.

Preferably, the holding disk may comprise a surface on to which the at least one through-hole opens and which is at least partially exposed to the granular reservoir. The surface may be operable to receive granules from the granular reservoir and the protruding member may be arranged to slide over the surface to push received granules across the surface as the selector disk is rotated relative to the holding disk and the granular reservoir between the first position and the second position.

In a specific embodiment, the granular reservoir may comprise a wall which cooperates with the feeder disk to form a channel comprising the at least partially exposed surface. Further, the least one protruding member may project into the channel and therefore be operable to push the received granules along the channel as the selector disk is rotated relative to the holding disk and the granular reservoir between the first position and the second position. Advantageously, the channel may comprise a channel width sufficient for the surface to receive granules in single file only.

It is also envisaged that the at least one protruding member may comprise a bell-shaped radial profile. Advantageously, the feeder disk may additionally or alternatively comprise a convex surface arranged to receive granules from the granular reservoir.

Advantageously, the feeder disk may comprise a plurality of through-holes and the at least one protruding member may be offset from a corresponding one of the plurality of through-holes in the first position to allow the granule to be received from the granular reservoir and held within the corresponding through-hole, and the at least one protruding member may occlude the corresponding through-hole in the second position to allow the granule held in the corresponding through-hole to dispense through the at least one dispensing aperture.

In a specific embodiment, the feeder disk may comprise a plurality of protruding members and, additionally, the dispensing disk may comprise a plurality of dispensing apertures, each one of the plurality of dispensing apertures being in registration with a corresponding one of the plurality of protruding members.

It is further envisaged that the dispenser may comprise a motor operable to drive rotation of the selector disk relative to the holding disk and granular reservoir. Specifically, the selector disk may further comprise an axis of rotation and the dispenser may further comprise a plurality of shafts extending through the selector disk, the plurality of shafts being distributed around the axis of rotation, and the motor may be operable to drive rotation of the selector disk relative to the holding disk and the granular reservoir by cycling the plurality of shafts around the axis of rotation. Advantageously, the motor may be operable to drive rotation at a speed of from about 30 RPM to about 80 RPM.

In a specific embodiment, the feeder disk may be integrally formed with the selector disk.

In a second aspect, there is provided a method of dispensing one or more granules of a plurality of granules received in the granular reservoir of a dispenser for granules. Specifically, the dispenser for granules includes a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and may be fixedly mounted (i.e. stationary) with respect to the granular reservoir, wherein the selector disk is rotatable/movable relative to the holding disk and the granular reservoir between a first position in which the at least one protruding member is offset from of the at least one through-hole to allow a granule to be received from the granular reservoir and held within the at least one through-hole by the non-dispensing portion of the dispensing disk and a second position in which the at least one protruding member occludes the at least one through-hole to allow the granule held in the through-hole to dispense through the at least one dispensing aperture, a plurality of granules being received in the granular reservoir. The method includes rotating the selector disk relative to the holding disk and the granular reservoir to cause the one or more granules to be dispensed from the at least one dispensing aperture.

It is envisaged that rotating the selector disk relative to the holding disk and the granular reservoir may comprise rotating the selector disk relative to the holding disk and the granular reservoir at a frequency of from 30 revolutions per minute to 80 revolutions per minute.

In a third aspect, there is provided a method of dispensing one of a plurality of granules received in a granular reservoir of a dispenser for granules. Specifically, the dispenser for granules includes a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and may be fixedly mounted (i.e. stationary) with respect to the granular reservoir, wherein the selector disk is rotatable/movable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture, a plurality of granules being received in the granular reservoir. The method includes rotating the selector disk relative to the holding disk and the granular reservoir from the first position to the second position.

Specifically, the holding disk may comprise t through-holes, and rotating the selector disk relative to the holding disk and the granular reservoir from the first position to the second position may comprise rotating the selector disk relative to the holding disk and the granular reservoir by an angle of $(360/t°)$.

In a fourth aspect, there is provided a method of fabricating, or making, a pharmaceutical formulation. The method includes providing a packaging for the pharmaceutical formulation, for example a capsule shell, and introducing a plurality of granules each comprising at least one active pharmaceutical ingredient of the pharmaceutical formulation into a dispenser for granules. Specifically, the dispenser for granules includes a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and may be fixedly mounted (i.e. stationary) with respect to the granular reservoir, wherein the selector disk is rotatable/movable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture, a plurality of granules being received in the granular reservoir. The method further includes dispensing a selected number of the plurality of granules through the at least one dispensing aperture and into the packaging for the pharmaceutical formulation by rotating the selector disk relative to the holding disk and the granular reservoir by a predetermined angle to cause the selected number of the plurality granules to be dispensed from the at least one dispensing aperture and into the packaging, the selected number of the plurality of granules corresponding to a predetermined dosage of the active ingredient of the pharmaceutical formulation.

In a fifth aspect, there is provided a tangible or non-tangible computer program comprising computer executable instructions that, when executed by a processor, cause the processor to control an additive manufacturing apparatus to manufacture a dispenser for granules. Specifically, the dispenser for granules includes a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and may be fixedly mounted (i.e. stationary) with respect to the granular reservoir, wherein the selector disk is rotatable/movable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture.

In a sixth aspect, there is provided a method of manufacturing a dispenser for granules via additive manufacturing. Specifically, the dispenser for granules includes a granular reservoir; a selector disk; and a holding disk. The selector disk itself comprises a feeder disk comprising at least one protruding member; and a dispensing disk arranged to rotate in concert with the feeder disk; the dispensing disk comprising at least one dispensing aperture and a non-dispensing portion, the at least one dispensing aperture being in registration with the at least one protruding member. The holding disk comprises at least one-through hole and is sandwiched, or interposed between the feeder disk and the dispensing disk and may be fixedly mounted (i.e. stationary) with respect to the granular reservoir, wherein the selector disk is rotatable/movable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture. The method includes obtaining an electronic file representing a geometry of the dispenser for granules; and controlling an additive manufacturing apparatus to manufacture, over one or more additive manufacturing steps, the dispenser for granules according to the geometry specified in the electronic file.

It should be appreciated that features relevant to one aspect may also be relevant to the other aspects.

BRIEF DESCRIPTION OF THE DRAWINGS

Exemplary embodiments will now be described with reference to the accompanying drawings in which.

DETAILED DESCRIPTION

Figure 1:
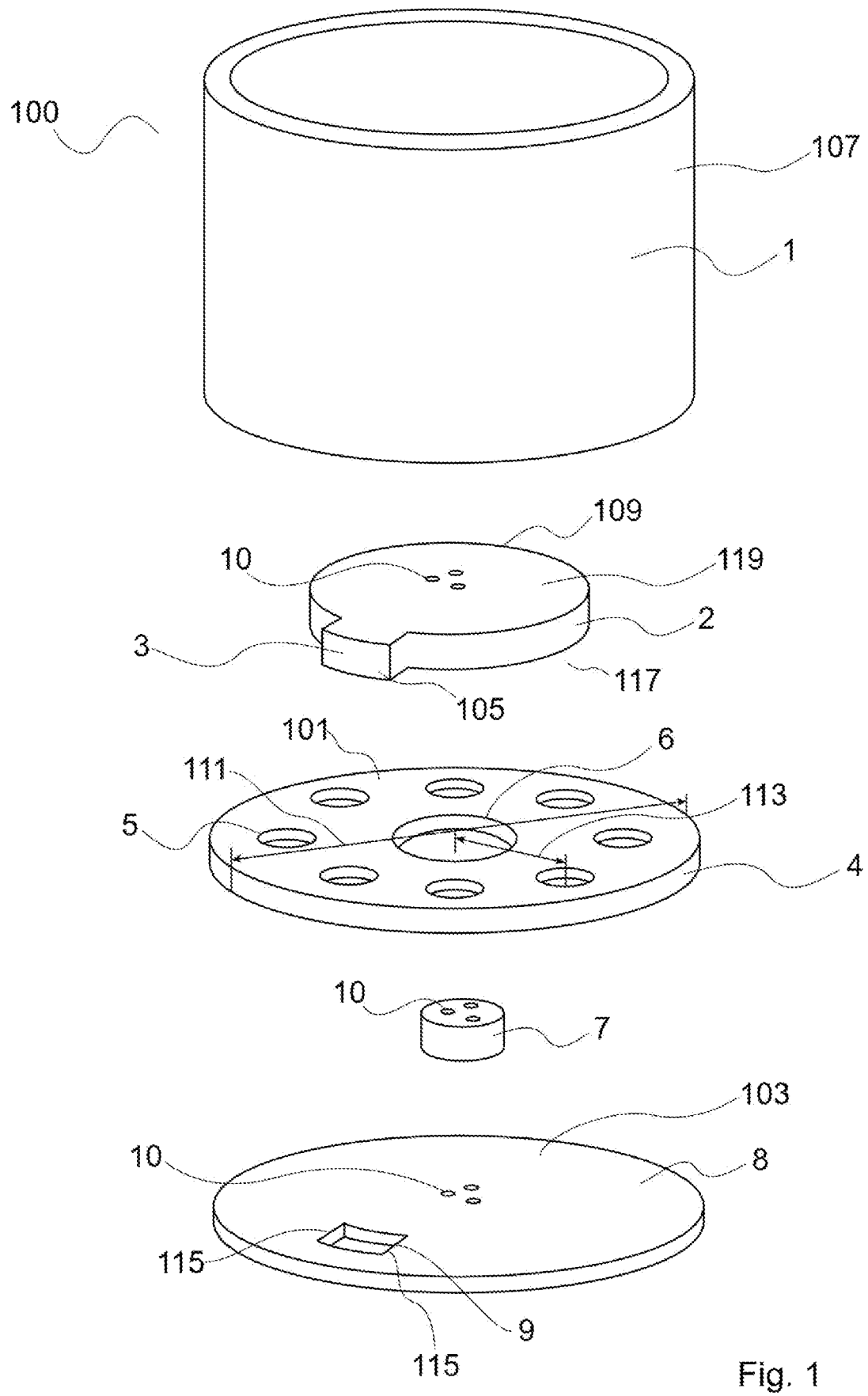
FIG. 1 illustrates a dispenser according to a preferred embodiment in exploded view.

FIG. 1 illustrates a dispenser 100 according to a preferred embodiment. The dispenser 100 is shown in exploded view so as to clearly illustrate the individual components of the dispenser 100, which include: a granular reservoir 1, a holding disk 4; and a selector disk which itself includes a feeder disk 2, a connector 7 and a dispensing disk 8.

The granular reservoir 1 is in the form of a wall 107 defining a hollow, cylindrically shaped enclosure open at both ends for storing granules for dispensing from the dispenser 100. In an example, granules with a diameter d from about 0.5 mm to about 3.5 mm, such as from about 1 mm to about 3 mm, may be stored in the granular reservoir 1.

The holding disk 4 is in the form of an annular plate having upper 101 and lower annular surfaces with a central through-hole 6. The plate is of a substantially uniform thickness which is, for example, approximately equal to, or slightly greater than the diameter of the granules which are to be dispensed from the dispenser 100. An outer diameter $d_{plate}$ 111 of the plate is approximately equal to a diameter of the granular reservoir 1. When assembled, the wall 107 of the granular reservoir 1 is fixed to the holding disk 4, for example using adhesive or other fastening means and the upper surface 101 of the holding disk 4 thus becomes a base for the granular reservoir 1. The holding disk 4 is therefore stationary with respect to the granular reservoir. This may be appreciated from FIGS. 2a and 2b which illustrate the assembled dispenser 100 in plan view.

In the described embodiment, the holding disk 4 further comprises eight cylindrical through-holes 5 in a polar array extending from the upper surface 101 of the plate to the lower surface, i.e. in an equally-spaced circular arrangement around an inner edge of the annular plate, the polar array having a radius r 113, where $r<d_{plate}$. The diameter $d_{hole}$ of each through-hole 5 and the thickness of the holding disk 4 are such that a hole size of each through-hole is sufficient for each though-hole 5 to accommodate one—and only one—granule for dispensing by the dispenser 100 at a time, i.e. $2d>d_{hole} \geq d$ and the thickness of the holding disk 4 is approximately equal to, or slightly greater than the diameter of the granules. At the same time, the through-holes 5 are positioned such that when assembled, an outer edge of each through-hole 5 is approximately aligned with an inner surface 203 of the wall of the granular reservoir 1, leaving a negligible amount (<<d) of the upper surface 101 of the holding disk 4 exposed between each through hole and the wall 107 of the granular reservoir 1.

Figure 2A:
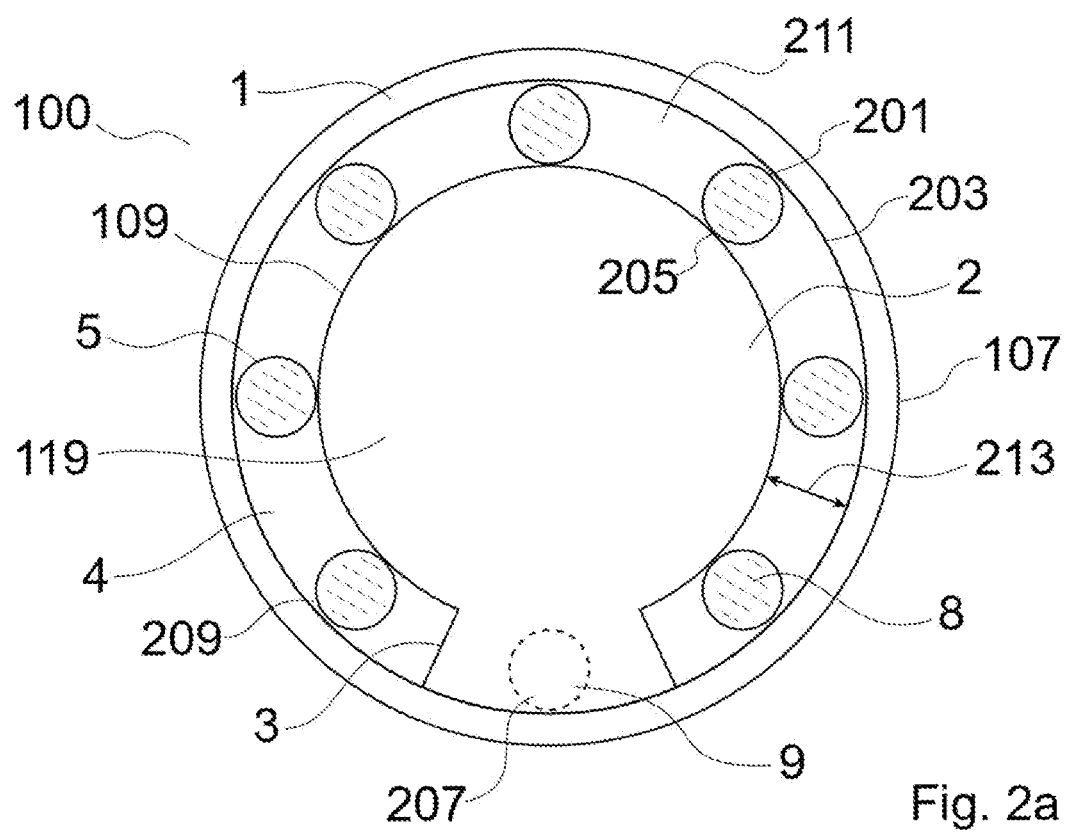
FIGS. 2a and 2b illustrate the dispenser of FIG. 1 in plan view.
Figure 2B:
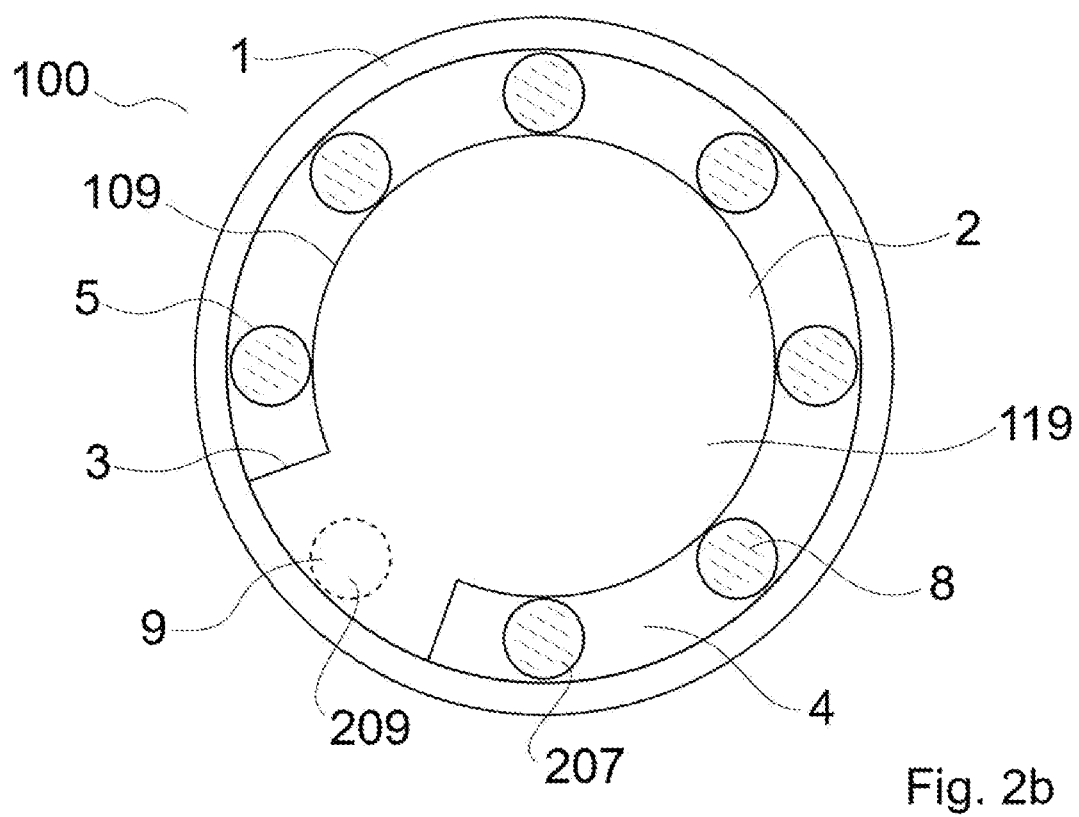

This is illustrated in FIGS. 2a and 2b which show a plan view of the assembled dispenser 100. It will be appreciated that at the point 201 a substantially continuous surface is formed between the inner surface 203 of the wall 107 of the granular reservoir 1 and the radially outer edge (relative to the holding disk 4) of the corresponding through hole 5.

As noted above, the selector disk of the dispenser 100 itself includes a feeder disk 2; a dispensing disk 8; and a cylindrical connector 7. When the dispenser 100 is assembled, the feeder disk 2 and dispensing disk 8 are connected via the cylindrical connector 7 which passes through through-hole 6 which has a diameter at least large enough to accommodate the connector 7. In this arrangement, therefore, the holding disk 4 is sandwiched between the feeder disk 2 and the dispensing disk 8, such that the feeder disk 2 slides over the upper annular surface 101 of the holding disk 4. The cylindrical connector 7 is fixed in place centrally within the through-hole 6, i.e. such that an axis of the cylindrical connector 7 is approximately coincident with an axis of the through-hole 6 while still enabling rotation of the cylindrical connector 7 with respect to the through-hole 6. For example, roller bearings may be included around the connector 7 in through hole 6 in order to fix the connector 7 approximately centrally within the through-hole 6 while simultaneously helping to minimize friction between the two upon respective rotation.

Figure 3A:
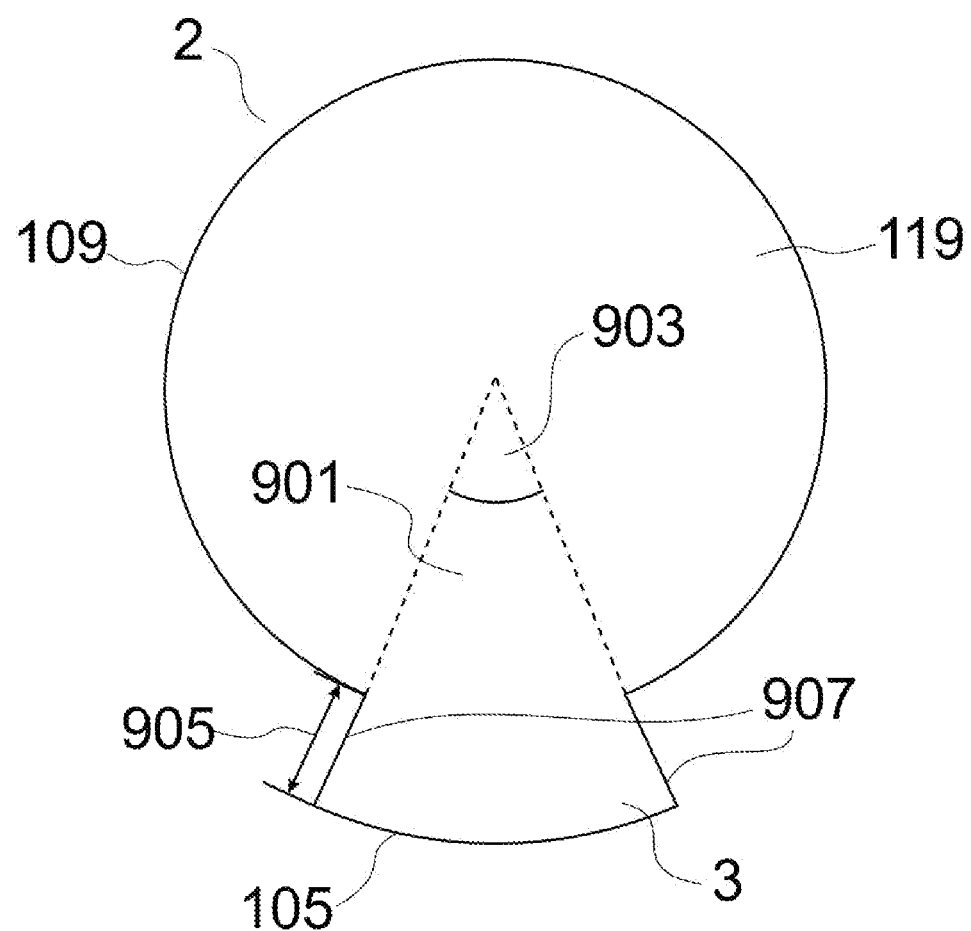
FIGS. 3a and 3b illustrate a feeder disk of the dispenser of FIG. 1, in plan and side view, respectively.
Figure 3B:
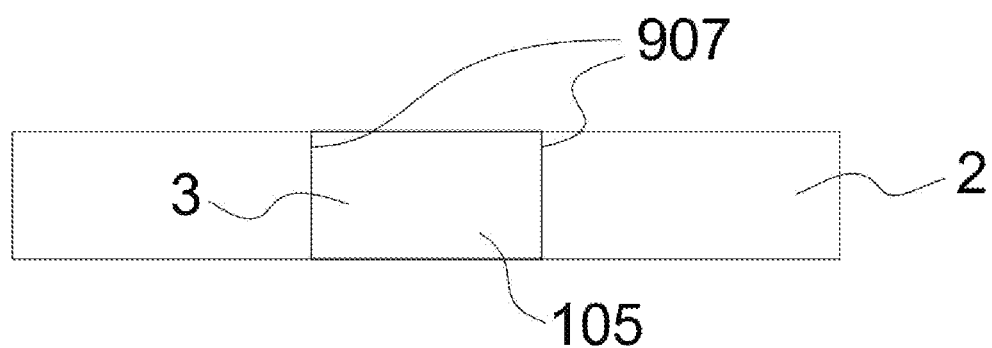

The feeder disk 2 includes a plate 117 with substantially planar upper 119 and lower (not visible) surfaces. The feeder disk 2 includes a projecting member 3 in the form of a radial extension to a section 901 of the otherwise substantially cylindrical plate, as illustrated in more detail in FIG. 3a which shows a plan view of the feeder disk 2. A central angle 903 of the extended section is approximately 45°. It will be appreciated from FIG. 3a that the central angle 903 is also a subtended angle of lateral edges 907 of the projecting member 3. The projecting member 3 further includes a radial edge 105 with a substantially rectangular radial profile, as can be appreciated from FIG. 3b which illustrates the feeder disk 2 in profile.

When assembled, a radial edge 109 of the feeder disk 2 not occluded by the projecting member 3 aligns approximately with a radially inner edge of each through hole 5 (relative to the holding disk 4), thereby exposing a negligible amount of space (<<d) on the upper surface 101 of the holding disk 4 between each through hole 5 and the feeder disk 2. This is illustrated in FIGS. 2a and 2b from which it will be appreciated that at the point 205 a substantially continuous surface is formed between the radial edge 109 of the feeder disk 2 and the radially inner edge of the corresponding through hole 5. Consequently, the radial edge 109 of the feeder disk 2 and the enclosure wall of the granular reservoir 1 cooperate to define a channel 211 onto which each of the through-holes 5 open and into which the protruding member 3 extends. A channel width 213 of the channel 211 is approximately d, i.e. granules can only fit into the channel in single-file.

The radial distance 905 by which protruding member 3 extends from the feeder disk 2 is approximately equal to the channel width 213. It will be appreciated from FIGS. 2a and 2b that this results in the protruding member 3 occluding the channel 211. In other words, a length of the protruding member 3 is such that when assembled there is negligible space (<<d) between its radially outer edge 105 and the inner surface 203 of the wall 107 of the granular reservoir 1.

As will also be appreciated from FIGS. 2a and 2b, the central angle 903 of approximately 45° corresponding to the subtended angle of lateral edges 907 of the protruding member 3 means that protruding member 3 may be positioned so as to completely occlude, or cover, one through hole 5 at a time, the particular through-hole 5 occluded at any moment in time being dependent on the position of the protruding member 3 relative to the holding disk 4, itself dependent on the relative rotational positions of the feeder disk 2 and the holding disk 4.

Returning to FIG. 1, the dispensing disk 8 includes a non-dispensing portion 103 in the form of a plate and a single dispensing aperture 9 in the form of a slot, or through hole passing through the plate, from one face of the plate to another. In the described embodiment, the dispensing aperture 9 is arcuate in shape and is sized to permit at least one granule at a time to pass through it. A subtended angle of lateral edges 115 of the dispensing aperture 9 is approximately 45° in order that the protruding member 3 may completely cover the dispensing aperture 9, as discussed further below.

Each of the feeder disk 2, the dispensing disk 8 and the cylindrical connector 7 further includes three optional through holes 10 arranged in a triangular configuration around their central axis (not shown in FIGS. 2 and 3 for clarity) enabling the feeder disk 2, the dispensing disk 8 and the cylindrical connector 7 to be fastened together in fixed axial relationship (i.e. to rotate in concert with each other relative to the holding disk 4), for example via three shafts each passing through one hole of each of the three components. In particular, the through-holes 10 are positioned so as to enable protruding member 3 and dispensing aperture 9 to be arranged in fixed registration with each other (i.e. to overlap) as can be appreciated from FIGS. 2a and 2b. The significance of this arrangement will become apparent below.

It will be appreciated that a wide range of different materials and manufacturing techniques could be employed to produce the dispenser 100, including both additive or subtractive manufacturing methods or a combination of the two. Examples of suitable materials for producing the dispenser 100 include (but are not limited to) Acrylonitrile Butadiene Styrene (ABS) 3D printing filament, aluminium, and stainless steel.

It should be appreciated that material and manufacturing technique selection may be driven by the nature of the granular material to be dispensed. For example, for applications including dispensing granules containing pharmaceutical ingredients, the dispenser 100 may be manufactured from pharmaceutical grade stainless steel, or other materials suitable for use in pharmaceutical equipment.

FIGS. 2a and 2b demonstrate the operation of the dispenser 100. As will be appreciated from the above description, the selector disk—comprising feeder disk 2, the dispensing disk 8 and the cylindrical connector 7—is rotatable relative to the holding disk 4 and the granular reservoir 1. To leave the granular reservoir 1, a granule passes through the holding disk 4, via one of the through-holes 5, which are stationary with respect to the granular reservoir 1. Due to the dispensing disk 8 including only a single opening—in the form of dispensing aperture 9—at most one through-hole 5 at a time allows passage, depending on which of the through-holes 5 (if any) are currently in registration with the dispensing aperture 9 according to the relative angle of rotation between the selector disk and the holding disk 4.

For example, in the configuration illustrated in FIG. 2a, only a single through-hole 207 aligns with the dispensing aperture 9. The remaining through-holes 5, which are offset from the dispensing aperture 9, do not allow passage, as the dispensing disk 8 occludes the underside of those through-holes 5, as indicated by the shaded portions of FIG. 2a. However, since the dispensing aperture 9 and protruding member 3 are in registration, i.e. overlap, through-hole 207 does allow passage via the dispensing disk 8 but is simultaneously occluded from above (i.e. the granular reservoir 1) by protruding member 3. The other through-holes 5, such as through-hole 209, however, being offset from the protruding member 3 are available to receive a granule from the granular reservoir 1 if not already occupied.

In FIG. 2b, the selector disk, including protruding member 3 and dispensing aperture 9, has been rotated clockwise relative to its position in FIG. 2a. Consequently, protruding member 3 and dispensing aperture 9 are now aligned with through-hole 209. While the base of through-hole 209 was previously blocked by the non-dispensing portion 103 of dispensing disk 8, through-hole 209 is now aligned with the dispensing aperture 9 to allow dispensing of a granule. However, since the protruding member 3 moves in unison with the dispensing aperture 9, through-hole 209 is now simultaneously occluded from above (i.e. from the granular reservoir 1) by protruding member 3.

It will be appreciated that during transition between the positions of FIGS. 2a and 2b, the protruding member 3, actuated by the motion of the feeder disk 2, would slide over the upper face 101 of the holding disk 4, i.e. the protruding member 3 acts as a slider. As well as bringing the protruding member 3 into alignment with a subsequent through-hole, this motion may cause the protruding member 3 to push granules incident on the upper face 101 along the channel 211 towards the subsequent through-hole 5 and beyond, depending on the number of granules present in the channel 211. This motion may therefore cause a given granule to fall into an available (i.e. currently unoccupied) through-hole 5, in which it will remain (the non-dispensing portion 103 of the dispensing disk 8 blocking the exit) until such time as the dispensing aperture 9 is brought into alignment with the corresponding through-hole via rotation.

In summary, a given through-hole 5 is capable of holding one, and only one granule. Once a granule is received by a through-hole 5, either directly from the granular reservoir or as a result of being pushed by the protruding member 3, the granule is held until the selector disk is rotated into a position in which the protruding member 3 occludes the corresponding through-hole and, simultaneously, dispensing aperture 9 in the dispensing disk 8 aligns with the corresponding through-hole 5 thereby allowing for dispensing of the granule held. In this position, the protrusion 3 covers the through-hole 5 aligned with the dispensing aperture 9, thus preventing any other granules from entering the through-hole from the granular reservoir 1 and escaping through the dispensing aperture 9. Thus, the mechanism of dispenser 100 is operable to dispense up to one granule per though-hole 5 per full rotation of the selector disk.

Rotation of the selector disk relative to the holding disk 4 may be actuated via a number of force-transfer means. In one example, such as when optional shafts are employed to join the feeder disk 2, the dispensing disk 8 and the cylindrical connector 7 via through holes 10 as described above, the shafts may be connected to a motor operable to cause the shafts to cycle around the axis of the selector disk and thereby induce rotation of the disk. As noted above, the three through-holes 10 are arranged in a triangular configuration around a central axis of each of the feeder disk 2, the dispensing disk 8 and the cylindrical connector 7, i.e. the through-holes are evenly distributed around the central axis. This arrangement assists in the transfer of torque upon induction of rotational motion around the axis, for example via actuation of the shafts to cause them to cycle around the central axis, which thus becomes an axis of rotation for the selector disk.

In an example, the motor may be operable to induce rotation of the selector disk up to, for example, from about 30 revolutions per minute to about 80 revolutions per minute, in particular from about 40 revolutions per minute to about 80 revolutions per minute, such as from about 45 revolutions per minute to about 75 revolutions per minute, more particularly from about 50 revolutions per minute to about 70 revolutions per minute; even more particularly, from about 60 revolutions to about 70 revolutions per minute.

Figure 4:
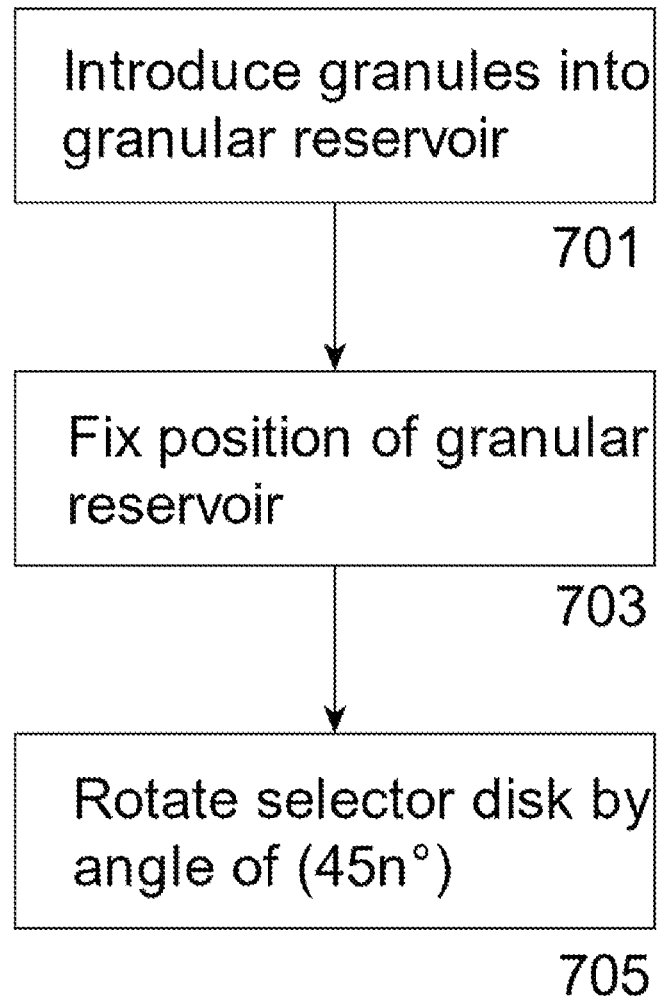
FIG. 4 illustrates a method of using the dispenser of FIG. 1.

A method of operating the dispenser 100 to dispense a desired, or selected number of granules n is illustrated in FIG. 4.

In step 701, granules are introduced into the dispensing reservoir 1.

In step 703, the position of the granular reservoir 1 is fixed. In an example, the granular reservoir 1 may be manufactured with outward protrusions extending from the enclosure wall 107 and the protrusions may be screwed to a plate on which the granular reservoir 1 is placed in order to hold the granular reservoir 1 fixed. It will be appreciated that other methods of fixing the position of the granular reservoir 1 (or equivalently the position of the holding disk 4) may be employed.

In step 705, the selector disk (comprising the feeder disk 2, the connector 7 and the dispensing disk 8) is rotated by an angle of approximately 45n degrees. It will be appreciated from FIGS. 2a and 2b that due to the equal radial distribution of the eight through holes 5, and central angle 903 of approximately 45°, each rotation of approximately 45° of the selector disk with respect to the holding disk 4 will result in one (and only one) of the through holes 5 being brought into registration with the dispensing aperture 9, and may enable the consequent dispensing of one granule. Therefore, in order to dispense n granules, n rotations of approximately 45° may be performed.

Thus, by placing relevant packaging at an appropriate distance underneath the dispensing disk 8, it may be possible to directly control and track the number of granules dispensed into said packaging, by regulating the amount of rotational motion (including, but not limited to, the number of rotations, or the degrees of rotation). The reliable dispensing of individual granules may therefore be ensured and continuous dispensing may be enabled.

Although axial motor-driven rotation is described above, the mechanism may also be flexible, potentially also enabling motor-driven rotation to be induced radially (through the usage of cogs) as well, without any reduction in the precision or continuous dispensing potentially achievable by the dispenser 100. The dispenser 100 may provide a significant accuracy-to-speed ratio and may enable approximately 100% accuracy up to approximately 70 RPM.

The dispenser 100 may also enable the dispensing of granules of small size (for example, from about 0.5 mm to about 3 mm diameter, or even smaller) without any reduction in precision. The dispenser 100 may also help to ensure that every rotation of the selector disk results in the dispensing of one single granule, even when there are very few granules left in the dispenser 100.

The ability to precisely control the number of granules dispensed from the encasing may enable the filling of packaging such as gelatin shell capsules with individually desired quantities. This may be exploited in a variety of fields such as customized medicine and polypharmacy, enabling customized dosages to be dispensed and granules containing different types of active substances to be dispensed into a single packaging in precise quantities —effectively combining multiple drugs into a single medication. This may enable the production of so called "poly-pills", filled with several types of granules that contain the active ingredients of multiple individual drugs which may mitigate the burden of consuming several such drugs, as only a single pill may need to be swallowed, thereby potentially improving patient adherence to medical regimes. Further, this may enable precise tailoring of dosages to individual patients, taking account of factors such as their weight, age, activity, diet, pharmacogenomics (how one's genes impact drug metabolism) or other factors that could potentially impact drug dosing and selection.

Figure 5:
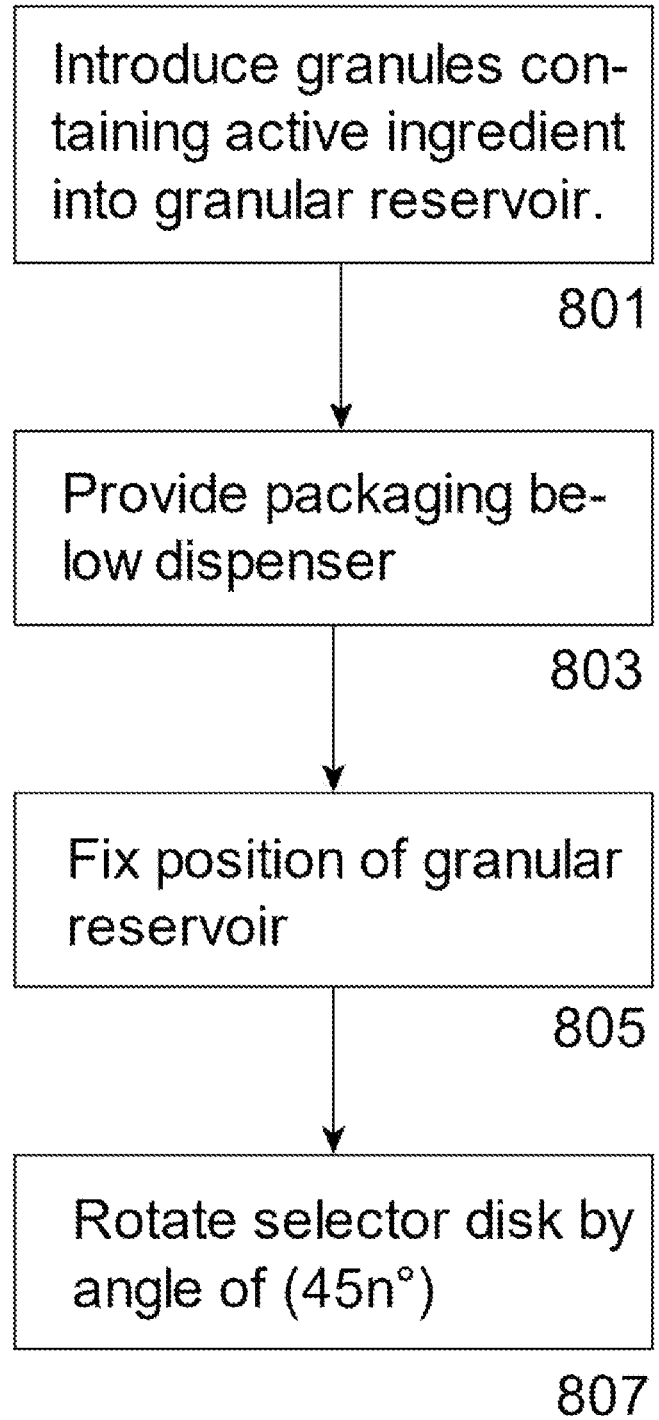
FIG. 5 illustrates a method of preparing a pharmaceutical formulation using the dispenser of FIG. 1.

FIG. 5 illustrates an exemplary method of fabricating, or making, a pharmaceutical formulation using the dispenser 100.

In step 801, granules comprising an active ingredient to be used in the pharmaceutical formulation are added to the granular reservoir 1. The granules may also include excipients.

In step 803, packaging for the pharmaceutical formulation, for example, a hard or soft shell of a capsule, such as a gelatin or cellulose shell suitable for encapsulation of a medicine and for direct consumption by a patient, is positioned under the dispenser 100 so as to receive granules dispensed by the dispenser.

In step 805 the position of the granular reservoir is fixed, for example as described above in relation to step 703 of FIG. 4.

In step 807, the selector disk is rotated by an angle of 45n degrees, where, in this instance, n is the number of granules corresponding to the quantity of the active ingredient to be used in the pharmaceutical formulation.

The method of FIG. 5 may be repeated for each active ingredient to be included in the pharmaceutical composition. If excipients not already included in the active ingredient granules are to be included in the composition, the process may also be repeated with granules including excipients only. Once all of the ingredients of the pharmaceutical formulation have been added the packaging, such as the capsule shell, it is then closed so that the formulation can be supplied as closed units to a patient. It will be appreciated that packaging other than gelatin or cellulose capsule shells may be employed.

The described embodiment should not be construed as limitative.

Figure 6:
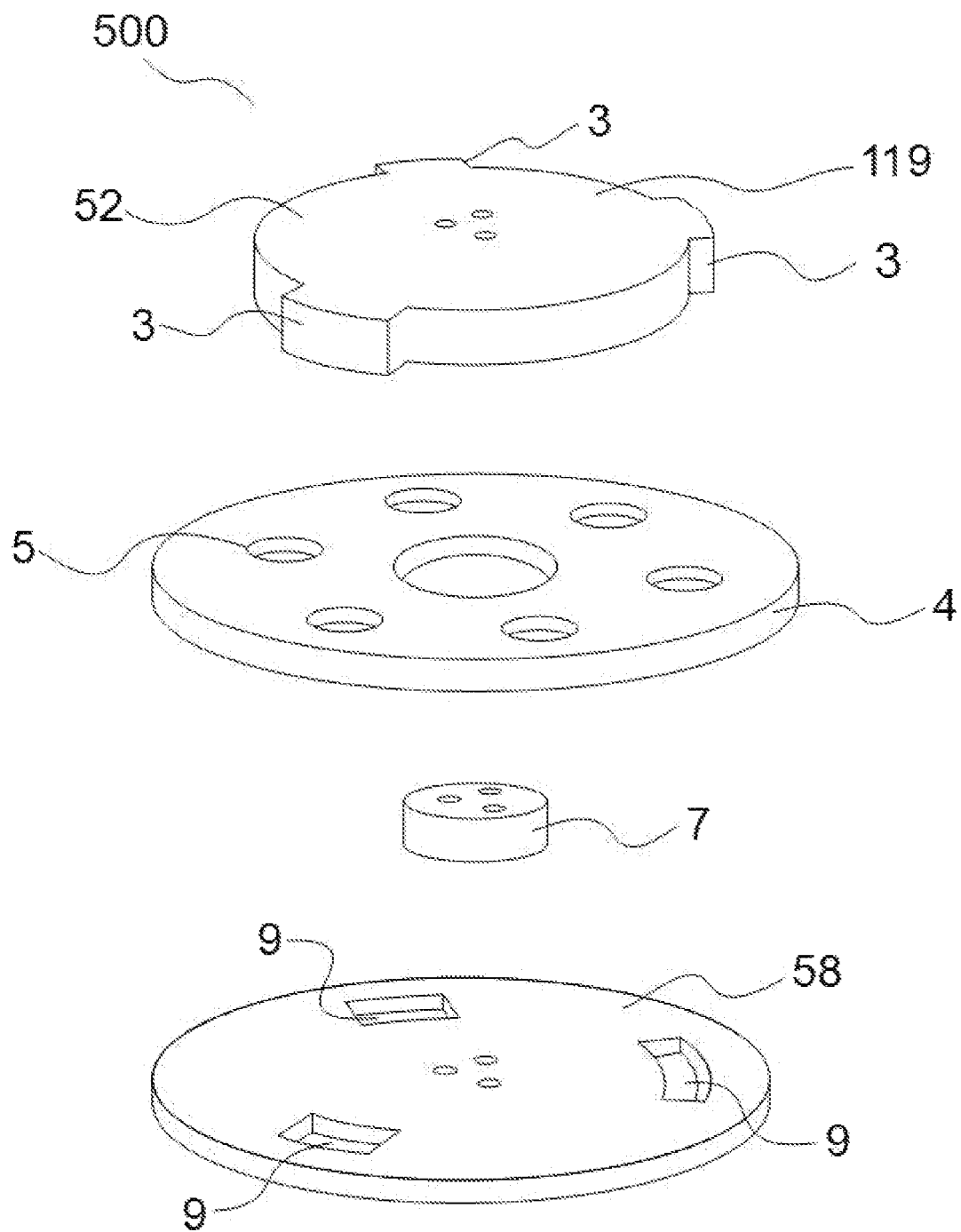
FIG. 6 illustrates a dispenser according to an alternative embodiment in exploded view.

FIG. 6 illustrates a dispenser 500 according to a further embodiment in which three, approximately equally spaced, protruding members 3 project from the feeder disk 52 and three corresponding dispensing apertures 9 (in registration with the three protruding members 3, as before) are present in the dispensing disk 58. Otherwise, the dispenser 500 is identical to that of FIG. 1 (note that in FIG. 6 the granular reservoir 1 is omitted for clarity) and like reference numerals are employed in FIG. 6 to denote the same components. For each rotation of the selector disk (comprising feeder disk 52, connector 7 and dispensing disk 58 in this further embodiment), therefore, a given through-hole 5 will align three times with one of the dispensing apertures 9. Thus, three granules may be dispensed per through-hole 5 per full rotation. Correspondingly, one rotation of approximately 45° may result in three granules being dispensed, one for each of the three dispensing apertures 9.

Figure 7A:
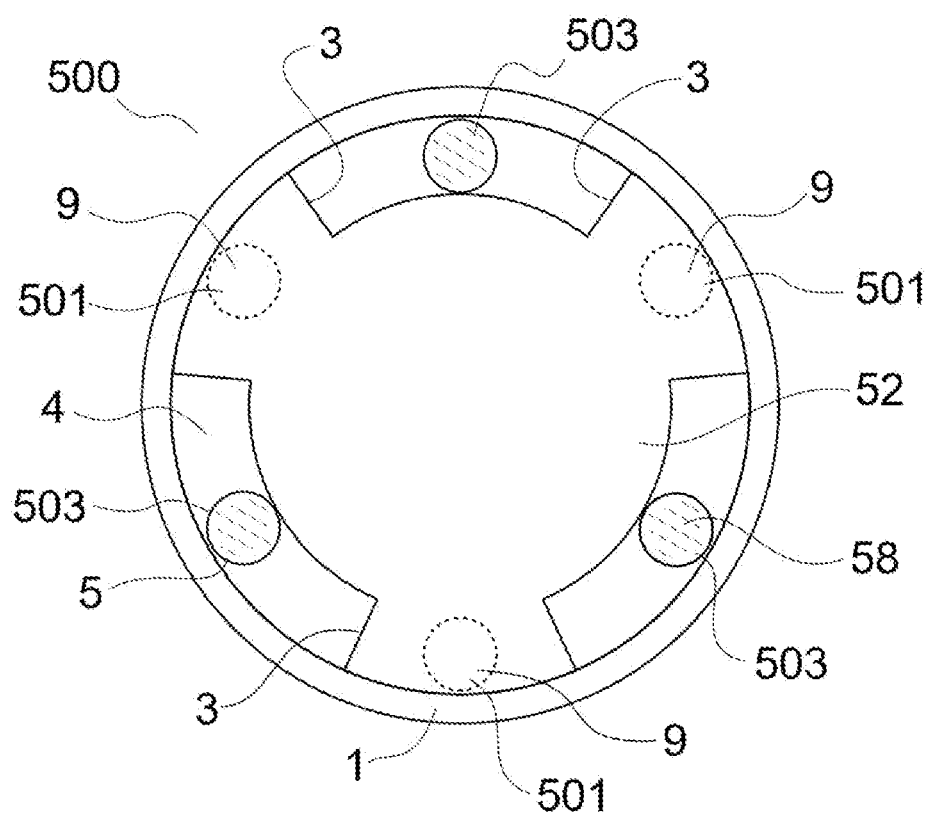
FIGS. 7a and 7b illustrate the dispenser of FIG. 6 in plan view.
Figure 7B:
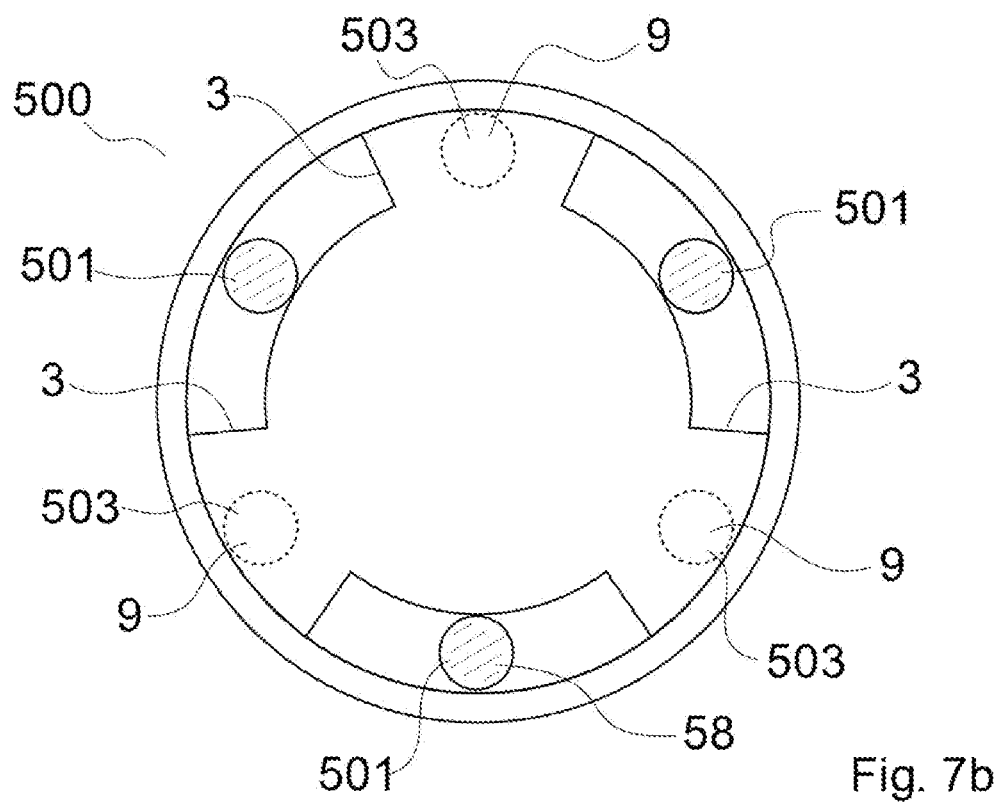

The operation of the dispenser 500 according to this alternative embodiment is further illustrated in FIGS. 7a and 7b which illustrate two different positions of the selector disk of the dispenser 500, respectively the dispenser 500 being illustrated in plan view.

In FIG. 7a three through-holes 501 align with dispensing apertures 9 in dispensing disk 58. The remaining through-holes 503, which are offset from any of the dispensing apertures 9, do not allow passage, as the dispensing disk 58 occludes the underside of the through-holes 503, as indicated by the shaded portions of FIG. 7a. However, since the dispensing apertures 9 and protruding members 3 are in registration, i.e. overlap, through-holes 501 do allow passage via the dispensing disk 58, being unobstructed from their underside but are simultaneously occluded from above by corresponding protruding members 3. The through-holes 503 however, being offset from any of the protruding members 3 are each available to receive a granule from the granular reservoir 1 if unoccupied.

In FIG. 7b, the feeder disk 52 and, simultaneously, the dispensing disk 58 have been rotated clockwise or anticlockwise relative to their positions in FIG. 7a and are now aligned with through-holes 503. While the bases of through-holes 503 were previously blocked by the non-dispensing portions of dispensing disk 58, through-holes 503 are now aligned with one each of the three dispensing apertures 9 of dispensing disk 58. However, since the protruding members 3 move in unison with the dispensing apertures 9, through-holes 503 are now occluded from above (i.e. from the granular reservoir 1) by protruding member 3, and previously occluded through-holes 501 are now able to receive a granule, if empty.

It will be appreciated that greater or fewer protruding members 3 and corresponding dispensing apertures 9 may be employed.

Figure 8A:
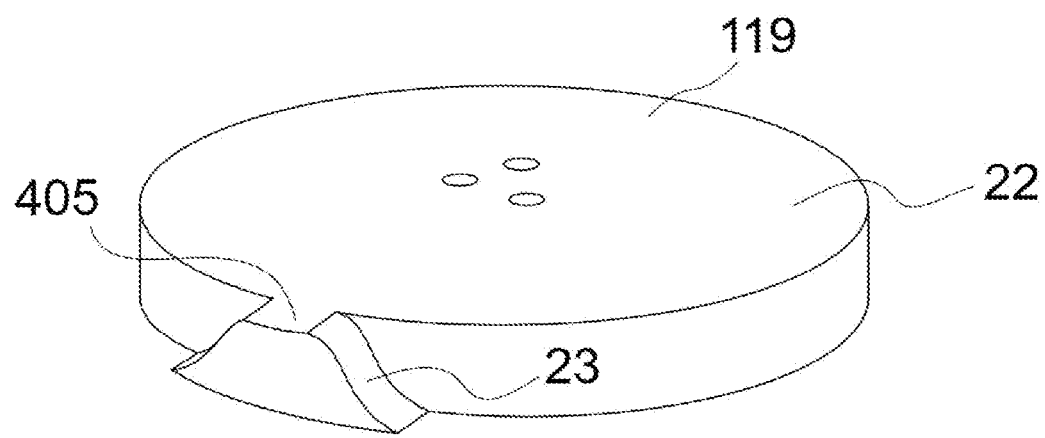
FIGS. 8a and 8b illustrate an alternative design of a feeder disk for use in the dispenser of FIG. 1, in perspective and side view, respectively.
Figure 8B:
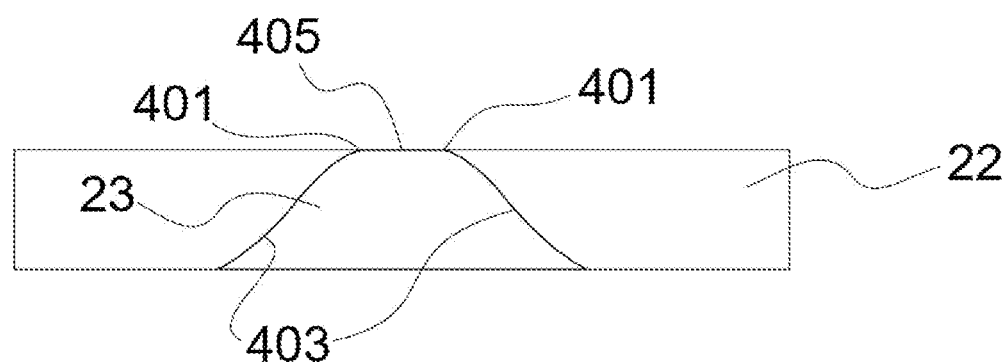

Further variations of the described embodiments are also envisaged. For example, while the protruding member 3 is described as having a rectangular-shaped radial profile in the above embodiments, it is envisaged that an alternative geometry may be employed. For example, FIG. 8a illustrates a feeder disk 22 including a protruding member 23 having slanted edges, FIG. 8b illustrates in detail the radial profile of the modified protruding member 23. Specifically, the example of the projecting member 23 illustrated in FIGS. 8a and 8b has an approximately bell-shaped profile having a flat top 405 with rounded corners 401 and lateral sides 403 which taper towards the lower edge of the feeder disk 22. The variation in geometry may provide improved speed and accuracy of guiding granules using the protruding member 23 into unoccupied through-holes 5 and enable a higher rotational speed of the dispenser 100 without loss in accuracy.

Figure 9:
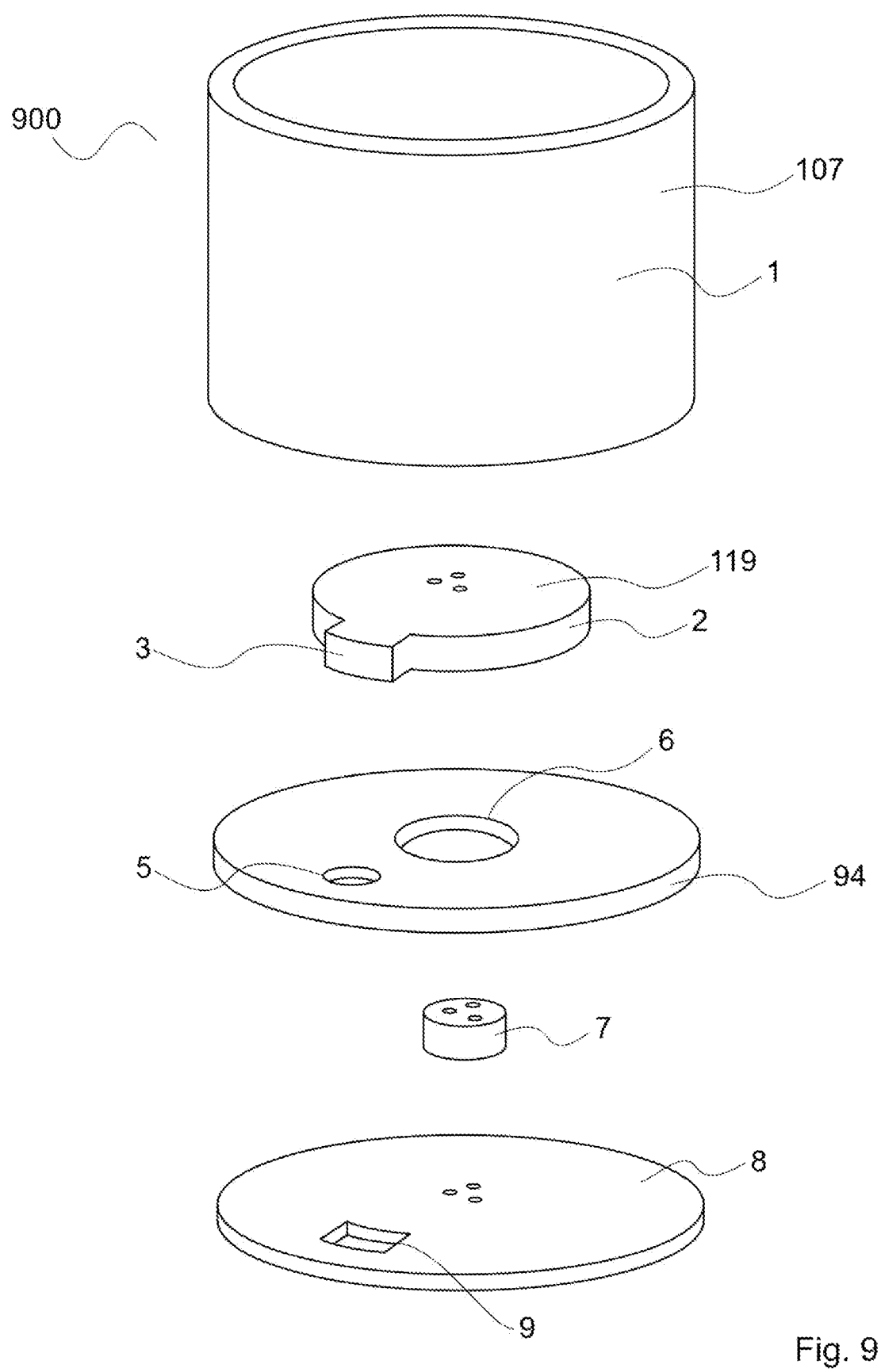
FIG. 9 illustrates a dispenser according to a further embodiment in exploded view.

Further, it is envisaged that fewer or greater numbers of through-holes 5 may be included in the holding disk 4 and correspondingly a greater or smaller rotation than 45° may be needed to dispense a single granule per dispensing aperture 9. FIG. 9 illustrates a dispenser 900 according to a yet further embodiment in which only a single through-hole 5 is present in the holding disk 94. Otherwise, the dispenser 900 is identical to that of FIG. 1, i.e. as before, the holding disk 94 forms a base for the granular reservoir 1, one protruding member 3 projects from the feeder disk 2 and one corresponding dispensing aperture 9 (in registration with the protruding member 3) is formed in the dispensing disk 8. Thus, for each full, 360° rotation of the selector disk (comprising feeder disk 2, connector 7 and dispensing disk 8 in this embodiment), only one granule in total may be dispensed from the dispenser 900.

In general, for t equally spaced through-holes in a polar array, it will be appreciated that up to one granule may be dispensed from each dispensing aperture 9 per rotation of $\theta=360°/t$ and that up to n granules may be dispensed per dispensing aperture 9 for a rotation of $n\theta$.

It is envisaged that reciprocate movement of the selector disk may be employed as an alternative or in addition to circular rotation, for example, in the embodiment of FIG. 9 in which only a single through-hole 5 is present. In this embodiment, back-and-forth movement of the selector disk may give rise to an improved efficiency for the dispensing of granules than full 360° rotation of the selector disk, necessitating a smaller angle of rotation for the dispensing of each granule.

It is envisaged that the central angle 903 for one or several of the projecting members 3, 23 may be varied, in accordance with, or independently from any change in the number and spacing of the through-holes 5. For example, the central angle 903 for one or several of the projecting members 3, 23 may vary in order to ensure that each of the projecting members 3, 23 has sufficient surface area to completely cover one (and only one) through-hole 5, regardless of the number of through-holes 5.

Although rotation of the selector disk according to embodiments is described above, it will be appreciated that rotation may alternatively, or simultaneously be achieved via direct rotation of the granular reservoir 1 and/or the holding disk 4, 94.

The through-holes 10 in the connector 7, feeder disk 2, 22, 52 and/or the dispensing disk 8, 58 are optional and two or more of the components of the selector disk may be mutually fixed together using an alternative means of fixation, such as adhesive. It is envisaged that rotation may not be driven via shafts, for example it may be driven radially via the use of cogs instead.

It is envisaged that the dispensing aperture 9 may not be arcuate in shape.

Although the feeder disk 2, 22, 52 is described as having a planar upper surface 119 which receives granules from the granular reservoir 1, it is envisaged that the upper surface 119 could instead be convex such as hemi-spherical or pyramidical, i.e. the centre of the surface 119 (and thereby the feeder disk 2, 22, 52) may project upwards into the centre of the granular reservoir 1, and slope down towards the channel 211 when the dispenser 100, 500, 900 is assembled. Such a convex surface, which receives granules from the granular reservoir 1 may help to direct granules on the surface of the feeder disk 2, 22, 52 into the channel 211 and ensure that granules don't remain stuck on the upper surface 119, in particular when the granular reservoir 1 is filled with granules which completely cover the feeder disk 2, 22, 52.

As such, although in the above-described embodiments the selector disk is described as being composed of three separate parts, alternatively, two or more of the parts may be formed integrally with each other. For example, the connector 7 may or may not be a stand-alone piece and may instead be integral with either the feeder disk 2, 22, 52 or the dispensing disk 8, 58. Alternatively, all three components of the selector disk may be integrally formed. Likewise, the holding disk 4, 94 and the granular reservoir 1 may be formed as a single component simultaneously or otherwise with the selector disk. As such, the entire dispenser 100, 500, 900 or a portion of the dispenser 100, 500, 900 for example a selector disk—holding disk 4, 94 assembly may be manufactured in fully assembled form.

Whether formed fully-assembled and/or integrally, or otherwise, any or all of the components of dispensers 100, 500, 900 according to the above-described embodiments may be formed using an additive manufacturing process. A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the disclosure to be integrally formed and include a variety of features not possible when using prior manufacturing methods.

Additive manufacturing methods described herein enable manufacture to any suitable size and shape with various features which may not have been possible using prior manufacturing methods. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes.

The additive manufacturing processes described herein may be used for forming components using any suitable material. For example, the material may be plastic, metal, composite, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in additive manufacturing processes which may be suitable for the fabrication of examples described herein.

As noted above, the additive manufacturing process disclosed herein allows a single component to be formed from multiple materials. Thus, the components of the dispensers 100, 500, 900 according to embodiments described above may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on three-dimensional (3D) information, for example a three-dimensional computer model (or design file), of the component.

Accordingly, examples described herein not only include the dispenser 100, 500, 900 or components thereof as described herein, but also methods of manufacturing the dispenser 100, 500, 900 or its components via additive manufacturing and computer software, firmware or hardware for controlling the manufacture of the dispenser 100, 500, 900 via additive manufacturing.

The structure of one or more parts of the dispenser 100, 500, 900 may be represented digitally in the form of a design file. A design file, or computer aided design (CAD) file, is a configuration file that encodes one or more of the surface or volumetric configuration of the shape of the product. That is, a design file represents the geometrical arrangement or shape of the dispenser 100, 500, 900.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist.

Design files can be produced using modelling (e.g. CAD modelling) software and/or through scanning the surface of a product to measure the surface configuration of the product.

Once obtained, a design file may be converted into a set of computer executable instructions that, once executed by a processer, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the dispensers 100, 500, 900 according to embodiments described above or any of the components of the dispensers 100, 500, 900, including but not limited to the selector disk and the holding disk 4, 94/granular reservoir 1 (individually or otherwise) using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the dispenser 100, 500, 900 or one or more of its components that can be used to physically generate the object, upon execution of the code or instructions by an additive manufacturing system. For example, the instructions may include a precisely defined 3D model of the dispenser 100, 500, 900 and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the dispenser 100, 500, 900. These can be printed either in assembled or unassembled form. For instance, different sections of the dispenser 100, 500, 900 may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the dispenser 100, 500, 900 (or one or more of its components) and instructing an additive manufacturing apparatus to manufacture the product in assembled or unassembled form according to the design file. The additive manufacturing apparatus may include a processor that is configured to automatically convert the design file into computer executable instructions for controlling the manufacture of the dispenser 100, 500, 900. In these embodiments, the design file itself can automatically cause the production of the dispenser 100, 500, 900 once input into the additive manufacturing device. Accordingly, in this embodiment, the design file itself may be considered computer executable instructions that cause the additive manufacturing apparatus to manufacture the dispenser 100, 500, 900. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

Having now fully described the invention, it should be apparent to one of ordinary skill in the art that many modifications can be made hereto without departing from the scope as claimed and that features of one embodiment may be combined with features of other embodiments.

The invention claimed is:

1. A dispenser for granules, comprising
   (i) a granular reservoir;
   (ii) a selector disk comprising:
      (a) a feeder disk comprising at least one protruding member;
      (b) a dispensing disk arranged to rotate in concert with the feeder disk;
      the dispensing disk comprising at least one dispensing aperture and a non-dispensing portion, the at least one dispensing aperture being in registration with the at least one protruding member; and
      (c) an axis of rotation;
   (iii) a holding disk comprising at least one through-hole sandwiched between the feeder disk and the dispensing disk and fixedly mounted with respect to the granular reservoir, wherein the selector disk is rotatable relative to the holding disk and the granular reservoir between a first position in which the at least one protruding member is offset from the at least one through-hole to allow a granule to be received from the granular reservoir and held within the at least one through-hole by the non-dispensing portion of the dispensing disk and a second position in which the at least one protruding member occludes the at least one through-hole to allow the granule held in the at least one through-hole to dispense through the at least one dispensing aperture;
   (iv) a motor operable to drive rotation of the selector disk relative to the holding disk and granular reservoir; and
   (v) a plurality of shafts extending through the selector disk, the plurality of shafts being distributed around the axis of rotation, and wherein the motor is further operable to drive rotation of the selector disk relative to the holding disk and the granular reservoir by cycling the plurality of shafts around the axis of rotation.

2. The dispenser for granules according to claim 1, wherein the holding disk comprises a surface on to which the at least one through-hole opens and which is at least partially exposed to the granular reservoir, the surface being operable to receive granules from the granular reservoir, and wherein the protruding member is arranged to slide over the surface to push received granules across the surface as the selector disk is rotated relative to the holding disk and the granular reservoir between the first position and the second position.

3. The dispenser for granules according to claim 2, wherein the granular reservoir comprises a wall which cooperates with the feeder disk to form a channel comprising the at least partially exposed surface, the at least one protruding member projecting into the channel, the at least one protruding member being further operable to push the received granules along the channel as the selector disk is rotated relative to the holding disk and the granular reservoir between the first position and the second position.

4. The dispenser for granules according to claim 3, wherein the channel comprises a channel width sufficient for the surface to receive granules in single file only.

5. The dispenser for granules according to claim 1, wherein the at least one protruding member comprises a bell-shaped radial profile.

6. The dispenser for granules according to claim 1, wherein the feeder disk comprises a convex surface arranged to receive granules from the granular reservoir.

7. The dispenser for granules according to claim 1, wherein the holding disk comprises a plurality of through-holes and wherein the at least one protruding member is offset from a corresponding one of the plurality of through-holes in the first position to allow the granule to be received from the granular reservoir and held within the corresponding one of the plurality of through-holes, and wherein the at least one protruding member occludes the corresponding one of the plurality of through-holes in the second position to allow the granule held in the corresponding one of the plurality of through-holes to dispense through the at least one dispensing aperture.

8. The dispenser for granules according to claim 1, wherein the feeder disk comprises a plurality of protruding members and wherein the dispensing disk comprises a plurality of dispensing apertures, each one of the plurality of dispensing apertures being in registration with a corresponding one of the plurality of protruding members.

9. The dispenser for granules according to claim 1, wherein the feeder disk is integrally formed with the selector disk.

10. The dispenser for granules according to claim 1, further comprising a plurality of granules received in the granular reservoir.

11. A method of dispensing one or more granules of the plurality of granules received in the granular reservoir of the dispenser for granules according to claim 10, the method comprising:
    rotating the selector disk relative to the holding disk and the granular reservoir to cause the one or more granules to be dispensed from the at least one dispensing aperture.

12. The method of dispensing one or more granules of the plurality of granules received in the granular reservoir of the dispenser for granules according to claim 11, wherein rotating the selector disk relative to the holding disk and the granular reservoir comprises rotating the selector disk relative to the holding disk and the granular reservoir at a frequency of from 40 revolutions per minute to 80 revolutions per minute.

13. A method of dispensing one of the plurality of granules received in the granular reservoir of the dispenser for granules according to claim 10, the method comprising: rotating the selector disk relative to the holding disk and the granular reservoir from the first position to the second position.

14. The method of dispensing one of the plurality of granules received in the granular reservoir according to claim 13, wherein the holding disk comprises t through-holes, and wherein rotating the selector disk relative to the holding disk and the granular reservoir from the first position to the second position comprises rotating the selector disk relative to the holding disk and the granular reservoir by an angle of $(360/t)°$.

15. A method of fabricating a pharmaceutical formulation, comprising:
    providing a packaging for the pharmaceutical formulation;
    introducing a plurality of granules each comprising at least one active pharmaceutical ingredient of the pharmaceutical formulation into the dispenser for granules according to claim 1; and
    dispensing a selected number of the plurality of granules through the at least one dispensing aperture and into the packaging for the pharmaceutical formulation by rotating the selector disk relative to the holding disk and the granular reservoir by a predetermined angle to cause the selected number of the plurality of granules to be dispensed from the at least one dispensing aperture and into the packaging, the selected number of the plurality of granules corresponding to a predetermined dosage of the at least one active ingredient of the pharmaceutical formulation.

16. A tangible computer program comprising computer executable instructions that, when executed by a processor, cause the processor to control an additive manufacturing apparatus to manufacture the dispenser for granules according to claim 1.

17. A method of manufacturing the dispenser for granules according to claim 1 via additive manufacturing, the method comprising:
- obtaining an electronic file representing a geometry of the dispenser for granules; and
- controlling an additive manufacturing apparatus to manufacture, over one or more additive manufacturing steps, the dispenser for granules according to the geometry specified in the electronic file.

18. The dispenser for granules according to claim 1, wherein the motor is operable to drive rotation at a speed of from 30 RPM to 80 RPM.

\* \* \* \* \*